2,924,574

BIPHENYLTRIPHENOXYSILANE

Herbert C. Kaufman, West Haven, Conn., assignor to John B. Pierce Foundation, New York, N.Y., a corporation of New York No Drawing. Application March 5, 1956
Serial No. 569,249

2 Claims. (Cl. 252—78)

This invention relates to a fluid heat transfer medium and to the method of transferring heat therewith.

Liquid heat transfer media which have the desired combination of properties of chemical stability at high temperature and fluidity at low temperature have long been sought. Johnson U.S. Patent No. 2,335,012 discloses as a heat transfer medium mixtures of tetra aryl orthosilicates. Morgan et al. U.S. Patent No. 2,674,579 discloses mixture of certain phenyl aryloxy silanes prepared by the reaction of phenyl trichlorosilane with a mixture of phenol and cresol. All of these compounds, however, suffer the disadvantage of low resistance to decomposition upon being heated for long periods of time. Such decomposition is probably caused by polymerization and is evidenced by an increase in viscosity. Moreover, since the individual compounds for the most part are solids, mixtures must be prepared in order to provide a fluid system.

An object of the invention is to produce a heat transfer medium that is a single liquid compound and hence is fluid without being a mixture.

Another object of the invention is to provide an improved heat transfer medium which is fluid at low temperatures and resistant to undesired increase in viscosity with time at high temperatures.

Still another object is to provide heat transfer liquids which have a viscosity below 700 centistokes at room temperature, good thermal stability, resistance to hydrolytic attack, are non-corrosive to metals encountered in heat transfer systems, and possess desirable heat transfer properties and physical constants. The product which fulfills the objects of the invention is biphenyl triphenoxysilane, represented by the following structural formula:

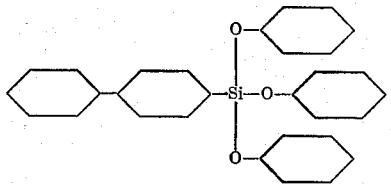

The product of the invention includes compounds in which the position of the silicon atom on the aromatic nucleus is ortho, meta or para, or mixtures of any of them. The products with the meta or para linkage are preferred, solely for reasons of availability and convenience.

Whereas prior heat transfer media have been characterized by increased viscosity when heated at elevated temperatures of 700 to 800° F., an outstanding, unexpected and advantageous property of the product of this invention is that its viscosity not only does not increase but actually decreases upon heating. The increase in viscosity found in the case of prior compositions indicates that polymerization is the principal mechanism of thermal decomposition or degradation. For heat transfer purposes, such viscosity increase ultimately causes intolerable loss in heat transfer ability of the liquid, because viscosity is the dominant parameter of heat transfer and low viscosity is always favorable. Any liquid which, through some anomaly, decreases its viscosity when heated improves rather than impairs its heat transfer ability.

The improved heat transfer medium of the invention may be prepared as follows: 1.2 moles, 346 grams, of a 50-50 mixture of meta and para biphenyl-trichlorosilane (a commercially available material) were melted at 45° C. and added rapidly to 4.3 moles, 406 grams of melted phenol at 45° C. with stirring. The phenol was in excess by 0.7 mole or 68 grams to insure complete reaction with the chlorosilane. HCl was evolved vigorously as heat was applied. The mixture was refluxed at 262° C. for 20 hours, then cooled and stripped of excess phenol at reduced pressure. 85 grams of phenol were recovered, as well as 515 grams of biphenyl-triphenoxysilane, representing a yield of 93.3% based on biphenyl-trichlorsilane. The properties of the product were as follows:

Color: Lemon, clear
Boiling point: 438° C. (820° F.) at 764 mm. Hg
Kinematic viscosity (Fenske):
    0° C. (32° F.)—3300 centistokes
    25° C. (77° F.)—139 centistokes
    370° C. (700° F.)—0.474 centistoke The viscosity of the product may be in the range 70 to 700 centistokes at 25° C.

The reaction will take place merely upon mixing of the compounds at room temperature, but the temperature is selected to facilitate the control of the reaction. Since the reaction proceeds in accordance with the general rules of chemistry and is accelerated by heat, it is preferred to heat the reactants to an elevated temperature up to the reflux temperature of the reaction mixture at some stage during the reaction, preferably near the end, to hasten and assure its completion and to remove the last traces of HCl. A physical scavenger (such as a stream of inert gas) may be used to facilitate the removal of the by-product, hydrogen chloride; or ammonia or an organic base such as pyridine or tertiary amines, etc., that combine with the hydrogen chloride to give a non-corrosive by-product, may be used.

In performing the reaction, caution should be taken to prevent evolution of hydrogen chloride gas at an excessive rate. This may be done by adding the phenyltrichlorosilane gradually to the phenol while the mixture is at an elevated temperature. If desired, however, all of the reactants may be mixed initially, provided the temperature is not above about 45° C., and thereafter the temperature may be raised gradually.

In order to compare the stability of the product of the invention with other heat transfer media heretofore known, a product was prepared in accordance with the Morgan Patent No. 2,674,579 as follows:

Into a reaction vessel equipped with an agitator and reflux condenser there was placed a mixture of 1.8 moles of phenol and 1.2 moles of cresol. The mixture was heated to 64° C., and 1.0 mol of phenyltrichlorosilane (a commercially available product) was added gradually over a period of one hour while maintaining the temperature of the reaction mixture at approximately 60° C. The reaction mixture was then heated gradually to reflux temperature and maintained there for a period of several hours to complete the reaction. The finished product [phenyl, phenoxy, cresoxy silane, $\phi$ $$Si(O\phi)_{1.8}(O\phi CH_3)_{1.2}]$$

was a mixture of the following compounds.

(1) 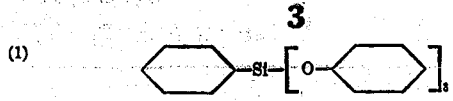

(2) 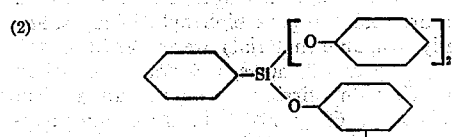

(3) 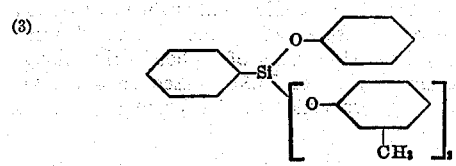

(4) 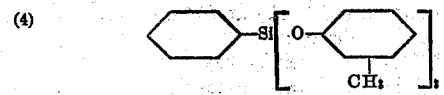

Color: Yellow
Viscosity: 55 cs./77° F.

The products were both subjected to the following accelerated aging and stability test. A sample of each liquid was placed in a glass tube enclosed at the bottom and having an open capillary at the top, open to the atmosphere. The tubes were immersed in a thermostatically controlled salt bath maintained at a constant temperature of 700° F. The tube was immersed so that the test fluid was at all times below the level of the bath liquid, while the top (end of the tube) with the superimposed capillary was allowed to project slightly above the insulated bath cover. Samples of the test fluid were removed at periodic intervals and their kinematic viscosity measured by an Ostwald capillary type (Fenske) viscometer at 25° C. Viscosities so measured were taken as an indication of thermal decomposition (or heat stability). The results of the heating test are shown in the following table:

Kin. viscosity (25° C.) in centistokes—heat tested at 700° F.

| Time (days) | 0 | 4 | 11 | 24 | 26 | 33 | 39 | 46 | 56 | 68 | 115 | 213 |
|---|---|---|---|---|---|---|---|---|---|---|---|---|
| Biphenyl triphenoxy silane | 165 | 125 | 100 | 84 |  |  | 83 |  | 83 | 78 | 78 | 76 |
| Phenyl, $\phi Si(O\phi)_{1.8}$ phenoxy $(O\phi CH_3)_{1.2}$ cresoxy silane | 55 | 59 | 89 |  | 234 | 510 |  | 1,730 |  |  |  |  |

The viscosity of the phenyl phenoxy cresoxy silane increased markedly upon heating, indicating substantial polymerization, whereas the viscosity of the product of the invention did not increase but in fact reflected a decrease, indicating superior heat transfer properties.

Although specific embodiments of the invention have been described herein, it is intended to cover within the scope of the appended claims all modifications and equivalents within the spirit and teaching of the invention.

I claim:

1. A compound having the following structural formula

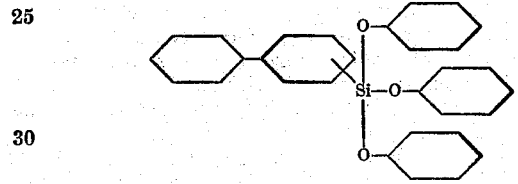

in which the position of the silicon atom on the aromatic nucleus is of the group consisting of ortho, meta and para, and mixtures of any of them.

2. The method of transferring heat to materials in indirect contact with a heat transmitting medium, which comprises using as a heat transmitting medium the compound described in claim 1.

References Cited in the file of this patent

UNITED STATES PATENTS

| 2,584,334 | Da Fano | Feb. 5, 1952 |
| 2,626,266 | Barry | Jan. 20, 1953 |
| 2,674,579 | Morgan et al. | Apr. 6, 1954 |
| 2,701,803 | Orkin | Feb. 8, 1955 |
| 2,800,495 | Haluska | July 23, 1957 |

UNITED STATES PATENT OFFICE

CERTIFICATE OF CORRECTION

Patent No. 2,924,574                                     February 9, 1960

Herbert C. Kaufman

It is hereby certified that error appears in the printed specification of the above numbered patent requiring correction and that the said Letters Patent should read as corrected below.

Column 2, line 49, for "phenyltri-" read -- xenyltri- --;

Signed and sealed this 9th day of August 1960.

(SEAL)
Attest:
KARL H. AXLINE                                           ROBERT C. WATSON
Attesting Officer                                       Commissioner of Patents